United States Patent [19]
Ward et al.

[11] Patent Number: 4,891,240
[45] Date of Patent: Jan. 2, 1990

[54] MICR CHARACTER COATING SYSTEM

[75] Inventors: Leonard G. Ward, Melbourne; Ronald R. Reidenauer, Palm Bay; Donald J. Kleinschnitz, Melbourne, all of Fla.

[73] Assignee: Storage Technology Corporation, Louisville, Colo.

[21] Appl. No.: 240,932

[22] Filed: Sep. 6, 1988

[51] Int. Cl.$^4$ .......................... B05D 5/08; B05C 9/00; B05C 11/00
[52] U.S. Cl. ......................................... 427/11; 118/46; 118/76; 118/669; 427/265; 400/105
[58] Field of Search .................. 427/11, 14.1, 265; 118/669, 76, 77, 46

[56] References Cited

U.S. PATENT DOCUMENTS

| | | | |
|---|---|---|---|
| 4,379,302 | 4/1983 | Dol et al. | 346/74.2 |
| 4,390,562 | 6/1983 | Yanagisawa | 427/11 |
| 4,581,283 | 4/1986 | Tokunaga et al. | 428/216 |
| 4,615,293 | 10/1986 | Jahn | 118/46 |
| 4,624,588 | 11/1986 | Bivin | 400/105 |
| 4,689,282 | 8/1987 | Gidon et al. | 430/39 |
| 4,779,558 | 10/1988 | Gabel et al. | 118/46 |

OTHER PUBLICATIONS

Troy 308A Financial Document Printer Maintenance Manual; Publication 50-70047-001 REV A Mar. 1987; pp. 1-10, 3-6, 3-7, 3-21, 4-2, 4-12, 6-32, 6-33 and 44 through 46.
TROY 308 Financial Document Printer Brochure, 1987.

Primary Examiner—Evan Lawrence
Attorney, Agent, or Firm—Dorr, Carson, Sloan & Peterson

[57] ABSTRACT

This magnetic ink character recognition (MICR) character coating system makes use of the application of an inexpensive lubricant that is selectively applied to the document, solely in the area where the MICR characters are printed. The lubricant of choice used in this apparatus is sodium stearate (soap). The lubricating apparatus includes a pair of rollers, between which the printed documents are fed. One of the rollers is a drive roller that advances the documents. Opposite of and spring loaded against the drive roller is a free running lubricating roller that is manufactured from a solid lubricant, which lubricating roller is of length equal to the length of the MICR character field that is printed on the document. In the printing of the document, a sensor mark is printed on the document and is used to indicate the beginning of the MICR character field. A sensor circuit detects the presence of the sensor mark and activates a solenoid to stop the lubricating roller from rotating as the document is fed past the lubricating roller. This causes the documents to be dragged across the lubricating roller, thereby applying a thin film of lubricant from the lubricating roller solely to the area of the document that contains the printed MICR characters. Thus, this MICR character printing apparatus both applies a lubricant only to the MICR character field on the printed surface of the document without coating the entire document and uses an inexpensive lubricant to extend the useful life of the printed MICR characters.

21 Claims, 2 Drawing Sheets

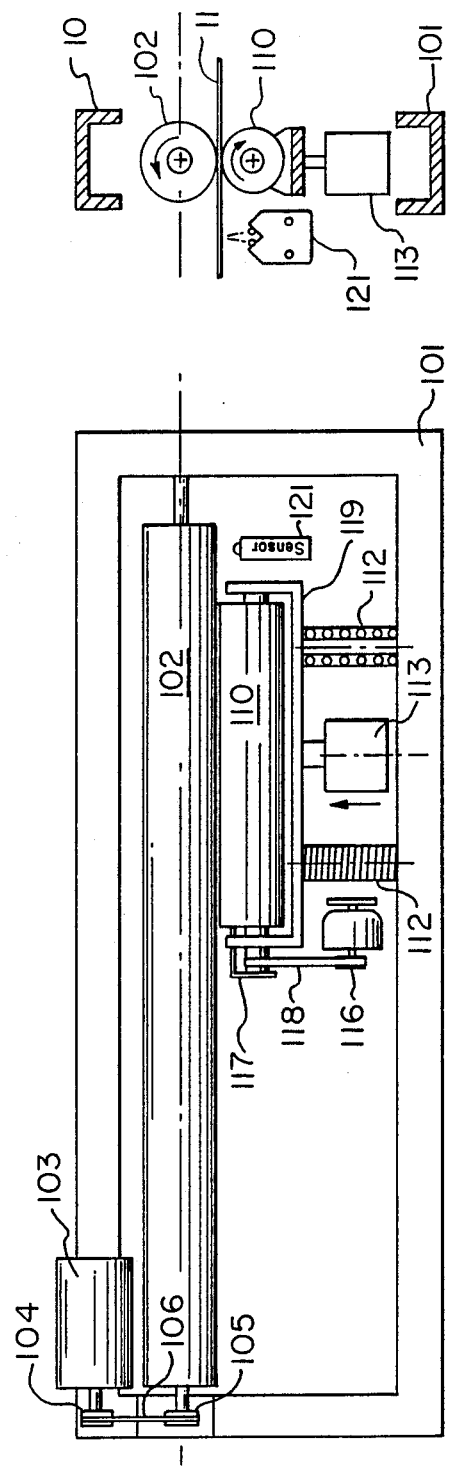

MICR CHARACTER COATING SYSTEM

FIELD OF THE INVENTION

This invention relates to magnetic ink character recognition (MICR) character printing apparatus and, in particular, to apparatus for coating the printed characters with a lubricant to extend the useful life of the printed MICR characters.

BACKGROUND OF THE INVENTION

It is a problem in the field of printing systems to print wear resistant MICR characters on a document. Magnetic ink character recognition (MICR) printing apparatus make use of a magnetically sensible toner to imprint machine readable indicia on documents. The toner is applied to the document in a standard electrophotographic printing process to generate the MICR characters on the document.

The MICR characters typically are fused to the surface of the documents by the use of a pair of rollers. The fusing roller is heated internally by a halogen lamp while the pressure roller has a silicone rubber surface. By "wringing" the paper between these two rollers, the toner is bonded or fused to the paper. Alternatively, a "cold" fusing system can be used which chemically melts the toner on the paper. In this system, the printed MICR characters do not go through pressure rollers. The fused MICR characters therefore stand higher on the document and are more susceptible to wear.

It is a problem in existing MICR printer apparatus systems that the magnetic read heads cause smearing of the MICR characters when the document has been read in magnetic readers a number of times. The character smearing causes errors in the machine reading of the MICR characters and necessitates manual intervention to read the MICR characters on the document.

Typical documents using printed MICR characters are negotiable checks, billions of which are processed daily. Each check has a line of MICR characters printed on the bottom of the check to identify the originator, home bank, amount of the check, etc. The check is returned to its home bank once it is cashed by processing it through the Federal Reserve System clearinghouses. There the check is read by passing it through a magnetic reader that deciphers the data contained in the line of MICR characters. Each check is read at least four times by a magnetic reader and sometimes over twenty times before returning to its home bank. The magnetic reading process is abrasive and can be destructive to the line of printed MICR characters, causing read errors.

One existing solution to this problem is illustrated in the Troy ® 308 Financial Document Printer that treats each finished document with a coating that prevents the MICR toner from smearing. The coating is applied all over the entire document to provide a lubricating agent on the surface of the document to minimize smearing of the printed and fused MICR characters. A problem with such an arrangement is that the coating used in this printer is an expensive lubricant in the form of a powder and brushing it on the entire document causes the use of far more lubricant than is required to protect the MICR characters. Lubricating the entire document surface also renders future writing or printing on the document surface difficult.

SUMMARY OF THE INVENTION

The above described problems are solved and a technical advance achieved in the field by the MICR character coating system of this invention. This MICR character coating system makes use of the application of an inexpensive lubricant that is selectively applied to the document, solely in the area where the MICR characters are printed. The lubricant of choice used in this apparatus is sodium stearate (soap).

The lubricating apparatus includes a pair of rollers, between which the printed documents are fed. One of the rollers is a drive roller that advances the documents. Opposite of and spring loaded against the drive roller is a free running lubricating roller that is manufactured from a solid lubricant, which lubricating roller is of length equal to the length of the MICR character field that is printed on the document. In the printing of the document, a sensor mark is printed on the document and is used to indicate the beginning of the MICR character field. A sensor circuit detects the presence of the sensor mark and activates a solenoid to stop the lubricating roller from rotating as the document is fed past the lubricating roller. This causes the document to be dragged across the lubricating roller, thereby applying a thin film of lubricant from the lubricating roller solely to the area of the document that contains the printed MICR characters. Thus, this MICR character printing apparatus both applies a lubricant only to the MICR character field on the printed surface of the document without coating the entire document and uses an inexpensive lubricant to extend the useful life of the printed MICR characters.

BRIEF DESCRIPTION OF THE DRAWING

FIG. 1 illustrates a perspective view of the MICR character printing apparatus;

FIG. 2 illustrates a cross section view of the MICR character printing apparatus;

DETAILED DESCRIPTION OF THE DRAWING

Figure 3:
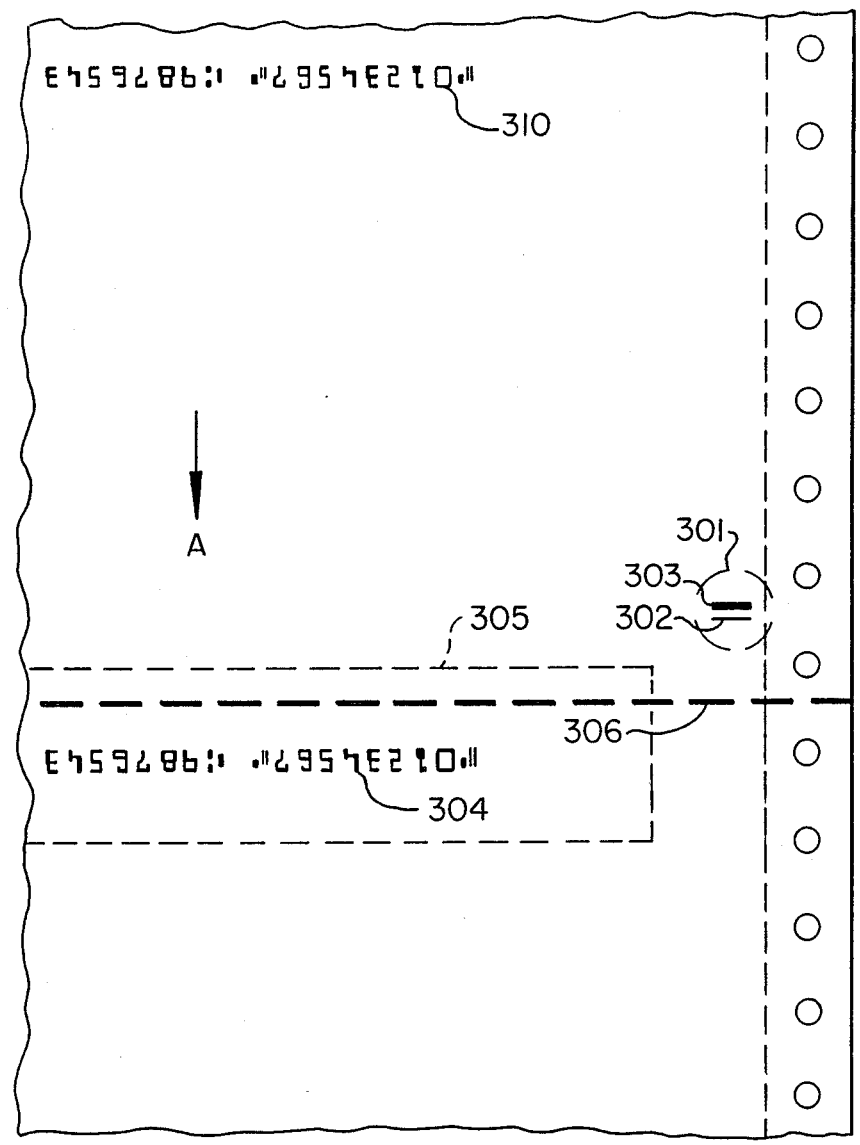
FIG. 3 illustrates the printed document showing the sensor mark and the MICR character printing area.

It is a problem in the field of printing systems to print wear resistant MICR characters on a document. Magnetic ink character recognition (MICR) printing apparatus make use of a magnetically sensible toner to imprint machine readable indicia on documents. The toner is applied to the document in a standard electrophotographic printing process to generate the MICR characters on the document. The MICR characters typically are fused to the surface of the documents by the use of a pair of rollers. The fusing roller is heated internally by a halogen lamp while the pressure roller has a silicone rubber surface. By "wringing" the paper between these two rollers, the toner is bonded or fused to the paper.

It is a problem in existing MICR printer apparatus systems that the magnetic read heads cause smearing of the MICR characters when the document has been read in magnetic readers a number of times. The character smearing causes errors in the machine reading of the MICR characters and necessitates manual intervention to read the MICR characters printed on the document. One existing solution to this problem is illustrated in the Troy ® 308 Financial Document Printer that treats each finished document with a coating that prevents the MICR toner from smearing. This coating is applied all over the entire document to provide a lubricating agent on the surface of the document to minimize smearing of the printed and fused MICR characters A problem with such an arrangement is that the coating used in this printer is an expensive lubricant in the form of a powder and brushing it on the entire document causes the use of far more lubricant than is required to protect the MICR characters. Lubricating the entire document surface also renders future writing or printing on the document surface difficult.

The MICR character coating system of this invention makes use of the application of an inexpensive lubricant that is selectively applied to the document, solely in the area where the MICR characters are printed. The lubricant of choice used in this apparatus is sodium stearate.

The lubricating apparatus includes a pair of rollers, between which the printed documents are fed. One of the rollers is a drive roller that advances the documents. Opposite of and spring loaded against the roller is a free running lubricating roller that is manufactured from a solid soap, which lubricating roller is of length equal to the length of the MICR character field that is printed on the document. In the printing of the document, a sensor mark is printed on the document and used to indicate the beginning of the MICR character field. A sensor circuit detects the presence of the sensor mark and activates a solenoid to stop the lubricating roller from rotating as the document is fed past the lubricating roller. This causes the document to be dragged across the lubricating roller, thereby applying a thin film of lubricant from the lubricating roller solely to the area of the document that contains the printed MICR characters. Thus, this MICR character printing apparatus both applies a lubricant only to the MICR character field on the printed surface of the document without coating the entire document and uses an inexpensive lubricant to extend the useful life of the printed MICR characters.

Lubricating Mechanism

FIG. 1 illustrates a top view of the MICR character printing apparatus of the present invention. This apparatus can, for example, consist of part of the forms stacker elevator for the printer mechanism (not shown). Element 101 is the elevator frame structure to which the lubricating apparatus is connected. The lubricating apparatus consists of a rubber coated drive roller 102 and a lubricating roller 110 between which the documents or forms 111 are fed. Drive roller 102 is driven by means of a drive roller motor 103 that has a gear 104 attached to the end thereof. Gear 104 drives drive roller 102 via gear 105 connected to the end of drive roller 102 through a mechanical linkage between gears 104 and 105, such as a belt mechanism 106. The lubricating roller 110 is a free running roller that is spring loaded against the forms 111 and the drive roller 102. In operation, drive roller motor 103 causes drive roller 102 to rotate, transporting forms 111 through the drive roller and the free wheeling lubricating roller 110. A spring mechanism 112 is used to hold lubricating roller 110 in contact against forms 111 and drive roller 102. Solenoid 113 is used to engage or disengage lubricating roller 110 in contact against forms 111 and drive roller 102. Also shown on FIG. 1 is a sensor 121 used to sense a timing mark that is printed on the documents or forms 111 that are fed through the elevator structure. In addition, a rotary solenoid 114, connected to lubricating roller 110 by means of gears 116, 117 respectively and belt 118, is used to brake lubricating roller 110 to cause it to stop its rotation. FIG. 2 illustrates a cross sectional end view of this lubricating apparatus.

In operation, a timing mark is printed on the document 111 and detected by sensor 121 to indicate when the line of MICR printed characters is about to be positioned between drive roller 102 and lubricating roller 110. Sensor 121 activates rotary solenoid 114 to cause lubricating roller 110 to stop rotating, which causes the forms 111 to be dragged across stationary lubricating roller 110 by drive roller 102 thereby coating the line of printed MICR characters with a thin film of lubricating element found on lubricating roller 110. When the line of printed MICR characters has gone beyond lubricating roller 110, the brake mechanism, consisting of rotary solenoid 114 gears 116, 117 and belt 118, releases and lubricating roller 110 free wheels on the forms 111 until the next line of MICR printing comes under the lubricating roller 110 as indicated by a timing mark associated with this line of printed MICR characters. The presence of a subsequent line of MICR characters causes the above described cycle to repeat. In this fashion, only a small area around the line of printed MICR characters is coated with the lubricant, not the entire form.

The lubricant used in this system is a solid roller of sodium stearate. Additional lubrication can be obtained by adding Teflon ® powder to the sodium stearate base or by the use of other similar materials to fabricate lubricating roller 110.

FIG. 3 illustrates the document 111 to be printed illustrating thereon the timing mark 301 which consists of a narrow bar 302 and a wide bar 303 printed along the outer edge of the document 111. The line of MICR characters 304 is located in the center of the document 111 for illustration purposes and the dotted box 305 drawn around the outer edge of the line of printed MICR characters 304 illustrates the area that is coated with lubricant by lubricating roller 110. A perforation mark 306 is also shown on FIG. 3 to illustrate the end of one page of the document 111 and beginning of the second page of the document when continuous form paper is used in the printer. A subsequent unlubricated line of MICR characters 310 is illustrated at the top of the figure. The documents 111 are fed through the printing and lubricating mechanism in a direction indicated by arrow "A" on FIG. 3.

Sequence of Operations

In operation, the following described sequence of operations takes place. When the power is turned on in the printer mechanism, the linear solenoid 113 that holds lubricating roller 110 away from forms 111 and drive roller 102 is energized so that spring 112 is compressed and lubricating roller 110 is not in contact with forms 111. This creates a gap through which forms can be loaded between drive roller 102 and lubricating roller 110. Then drive motor 103 for drive roller 102 is energized, drive roller 102 begins rotating in the counterclockwise direction as illustrated by the arrow in FIG. 2. Forms 111 are loaded into the printing mechanism (not shown) and the printing cycle begins, printing lines of MICR characters on the documents in addition to other printing thereon as the forms 111 move in direction "A". When the first trigger mark 301 is detected by the reflective sensor 121, linear solenoid 113 is de-energized which allows spring 112 to transport frame 119 and its lubricating roller 110 into contact against forms 111 and drive roller 102. The counterclockwise rotation of drive roller 102 causes a clockwise rotation of lubricating roller 110 as illustrated by the arrow in FIG. 2. The detection of the trigger mark 301 by sensor 121 also energizes rotary solenoid 114 which brakes lubricating roller 110 to a stop so that drive roller 102 advances forms 111 in direction "A" across the stationary lubricating roller 110, coating the line of MICR characters 304 with a thin film of the lubricant contained on lubricating roller 110. The length of time that rotary solenoid 114 is energized determines the length of the area on the forms 111 that is coated with a lubricant. The time duration of this cycle can be either a fixed period of time to lubricate a fixed size area, or can be adjustable by, for example, the use of a coded timing mark 301 that indicates to the control circuit the desired cycle time. During the entire printing process, the linear solenoid 113 remains de-energized and the rotary brake solenoid 114 is cycled on and off by sensor 121 each time a timing mark 301 is detected by sensor 121.

While a preferred embodiment of this invention has been shown, it is expected that those skilled in the art can and will devise variations of the disclosed embodiment which variations fall within the scope of the appended claims.

I claim:

1. Apparatus for printing wear resistant MICR characters on a document that has a predetermined length and width comprising:
   means for printing a set of MICR characters on said document in a predefined area thereon, the length of said area being less than said document length;
   means for applying a lubricant coating exclusively to said predefined area containing said printed set of MICR characters;
   means for positioning said area of said document containing said printed set of MICR characters opposite said applying means subsequent to the printing of said set of MICR characters thereon; and
   means responsive to the juxtaposition of said predetermined area containing said printed set of MICR characters opposite said applying means for enabling said applying means to apply said lubricant coating to said predefined area.

2. The apparatus of claim 1 wherein said enabling means includes:
   means for identifying the presence of a sensor mark printed on said document indicative of the presence of said predetermined area of MICR characters.

3. The apparatus of claim 1 wherein said applying means further includes:
   means for disabling said applicator means a predetermined time after said enabling means enables said applicator means to thereby terminate the coating of said predetermined area of said document with said lubricant.

4. The apparatus of claim 1 wherein said lubricant coating comprises sodium stearate.

5. The apparatus of claim 1 wherein said lubricant coating comprises Teflon ® powder in a sodium stearate base.

6. Apparatus for producing, on a document that has a length and width, a wear resistant set of MICR characters printed in a predefined area thereon, the length of said predefined area being less than said document length comprising:
   means for applying a lubricant coating exclusively to said predefined area on said document containing said printed set of MICR characters;
   means for positioning said predefined area of said document containing said printed set of MICR characters opposite said applying means subsequent to the printing of said set of MICR characters thereon;
   means for identifying the juxtaposition of said predefined area of said document containing said printed set of MICR characters opposite said applying means; and
   applicator means responsive to said identifying means for coating only said predefined area of said document containing said printed set of MICR characters with a lubricant.

7. Apparatus for producing a set of wear resistant MICR characters on a document comprising:
   first and second roller means between which said document is fed for applying a lubricant coating exclusively to the area on said document containing said printed set of MICR characters;
   drive means for rotatably activating said first roller means to feed said document between said first and second roller means;
   wherein said second roller means is a freely rotating lubricant applicator;
   brake means for terminating the rotation of said second roller means to drag said document across said second roller means to apply said lubricant from said second roller means to said document.

8. The apparatus of claim 7 further including:
   means for identifying the juxtaposition of said area on said document containing said printed set of MICR characters with said second roller means.

9. The apparatus of claim 8 further including:
   means responsive to said identifying means for activating said brake means for a predetermined length of time to coat a predetermined area of said document with said lubricant.

10. The apparatus of claim 8 wherein said document includes a sensible mark indicative of the location of said printed set of MICR characters, said identifying means includes:
    sensor means for detecting the presence of said sensible mark on said document;
    means responsive to said sensor means for activating said brake means for a fixed period of time.

11. The apparatus of claim 8 wherein said document includes a sensible mark indicative of the location of said printed set of MICR characters, said identifying means includes:
    sensor means for detecting the presence and data content of said sensible mark on said document;
    means responsive to said sensor means for activating said brake means for a length of time indicated by said data content of said sensible mark.

12. The apparatus of claim 7 wherein said second roller comprises a solid sodium stearate.

13. The apparatus of claim 7 wherein said second roller comprises a Teflon ® powder in a solid sodium stearate base.

14. Apparatus for producing a wear resistant set of MICR characters in an area of predetermined width and length and predetermined location on a document, wherein said area is of length less than said document comprising:
    lubricant applicator means of width at least equal to the width of said area for applying a lubricant exclusively to said area of render said printed set of MICR characters wear resistant;

means for positioning said area opposite said lubricant applicator means;

means for feeding said document across said lubricant applicator means for a distance at least equal to the length of said area;

means for identifying the presence of the sensor mark printed on said document indicative of the beginning of said area being positioned opposite said lubricant applicator means; and means for activating said lubricant applicator means at the beginning of the length of said area.

15. The apparatus of claim 14 wherein said lubricant applicator means comprises a soap applicator.

16. A method of printing wear resistant MICR characters on a document that has a predetermined length and width comprising the steps of:

printing a set of MICR characters on said document in a predefined are thereon, the length of said area being less than said document length;

positioning said predefined area of said document containing said printed set of MICR characters opposite a lubricant applicator;

identifying the juxtaposition of said predefined area of said document containing said printed set of MICR characters opposite said lubricant applicator; and activating said lubricant applicator to coat exclusively said predefined area of said document containing said printed set of MICR characters with said lubricant.

17. The method of claim 16 wherein said step of identifying includes the step of:

sensing the presence of a sensor mark printed on said document indicative of the juxtaposition of said predefined area of said document containing said printed set of MICR characters opposite said lubricant applicator.

18. The method of claim 16 further including the step of:

disabling said lubricant applicator a predetermined time after said lubricant begins coating said predefined area of said document containing said printed set of MICR characters with said lubricant.

19. A method of producing, on a document that has a length and width, a wear resistant set of MICR characters printed in a predefined area thereon, said area having length less than said document length, comprising the steps of:

positioning said predefined area on said document containing said printed set of MICR characters opposite a lubricant applicator;

identifying the juxtaposition of said predefined area of said document containing said printed set of MICR characters opposite said lubricant applicator; and activating said lubricant applicator to coat only said predefined area of said document containing said printed set of MICR characters with said lubricant.

20. A method of producing a wear resistant set of MICR characters in an area of predetermined width and length and predetermined location on a document, where said area is of length less than said document, comprising the steps of:

positioning said area opposite a lubricant applicator of width at least equal to the width of said area;

activating said lubricant applicator at the leading edge of said length of said area to apply a lubricant exclusively to said area of render said printed set of MICR characters wear resistant.

21. The method of claim 20 further including the steps of:

feeding said document across said lubricant applicator for a distance at least equal to the length of said area;

disabling said lubricant applicator at the trailing edge of said length of said area.

* * * * *